US007556708B2

(12) United States Patent
Phillips et al.

(10) Patent No.: US 7,556,708 B2
(45) Date of Patent: Jul. 7, 2009

(54) APPARATUS AND METHOD FOR APPLYING LABELS

(75) Inventors: Robert Phillips, Eden Prairie, MN (US); Mark Westin, St. Paul, MN (US)

(73) Assignee: Advanced Label Systems, Inc., St. Paul, MN (US)

( * ) Notice: Subject to any disclaimer, the term of this patent is extended or adjusted under 35 U.S.C. 154(b) by 1363 days.

(21) Appl. No.: 10/462,021

(22) Filed: Jun. 13, 2003

(65) Prior Publication Data

US 2004/0250947 A1 Dec. 16, 2004

(51) Int. Cl.
*B32B 38/04* (2006.01)
*B32B 38/14* (2006.01)

(52) U.S. Cl. ....................... 156/250; 156/253; 156/256; 156/270; 156/277

(58) Field of Classification Search ................ 156/196, 156/199, 247, 249, 250, 252, 253, 256, 267, 156/269, 270, 277; 428/33, 41.7, 41.8, 101, 428/212, 213, 215
See application file for complete search history.

(56) References Cited

U.S. PATENT DOCUMENTS 2,303,346 A * 12/1942 Flood ......................... 156/152
2,492,908 A 12/1949 Von Hofe .................... 216/55
3,565,750 A 2/1971 Evans ........................ 428/41.4
3,574,026 A 4/1971 Kucheck ..................... 156/152
4,468,274 A 8/1984 Adachi ....................... 156/320
4,978,415 A 12/1990 Jones ......................... 156/517
5,292,713 A 3/1994 Stenzel et al. ............... 503/226
5,354,588 A 10/1994 Mitchell et al. ............... 428/40
5,560,293 A 10/1996 Boreali et al. ............... 101/288
5,624,520 A 4/1997 Nedblake et al. ............ 156/249
5,674,345 A 10/1997 Nash .......................... 156/264
5,817,386 A * 10/1998 Adamko et al. ............ 428/41.3
6,187,128 B1 2/2001 Oosterlinck ................. 156/249
6,206,071 B1 3/2001 Majkrzak et al. ............ 156/519
6,571,983 B1 6/2003 Schumann et al. ............ 221/25
6,592,693 B1 7/2003 Nedblake ..................... 156/64
6,695,501 B2 * 2/2004 Nedblake et al. ............ 400/621

OTHER PUBLICATIONS

"Controlling costs challenges label stock, liner suppliers," Paper, Film & Foil Converters, Jan. 1995. Retrieved from the Internet: ::<URL:http://pffc-online.com/ar/ paper_controlling_costs_challege/index/htm.>.
Kaj Koskinen and Mikko Rissanen, "Cost savings through raw material efficiency," Label Papers for the World, UPM-Kymmen Label Papers Customer Magazine, Feb. 2001, pp. 8-11. Retrieved from the Internet: <URL:http://w3.label.upm-kymmene.com>.
"Label adhesive," Packwood.com Apr. 2000, p. 82. Retrieved from the Internet:<URL:http://packworld.com/articles/Products/11407.html>.

* cited by examiner

*Primary Examiner*—Philip C Tucker
*Assistant Examiner*—Sing P Chan
(74) *Attorney, Agent, or Firm*—Mark A. Litman & Associates P.A.

(57) ABSTRACT

A method and apparatus enables linered label applicators to use labels on thin liners. Linered labels comprise a composite of an elongate sheet of thin or light-weight temporary liner having a precut label adhered to a low adhesion surface. The cut-out labels on the liner are fed into the linered label applicator. The use of support mechanisms other then vacuum application on rollers enables the use of thinner liner sheets on labels.

27 Claims, 6 Drawing Sheets

APPARATUS AND METHOD FOR APPLYING LABELS

BACKGROUND OF THE INVENTION

1. Field of the Invention

The present invention relates to the field of labels that are provided either on liners or without separation liners between the labels. The invention also relates to a method of using lower weight liners in label application processes to reduce operating costs. The present invention also relates to apparatus and methods for applying regular label stock and linerless labels to substrates. The present invention also relates to the use of either microperfing (microbridging) of label stock or complete cutting of labels from a matrix prior to lamination with liners. The present invention also relates to the use of labeling apparatus that can support cut labels without the use of vacuum systems.

2. Background of the Art

Labels can be provided in many different formats. The most significant format of labels is a label material (often referred to as the face stock, e.g., natural or synthetic fiber paper, polymeric film, metal foil, or combinations of these materials) with a backside adhesive (e.g., either pressure-sensitive adhesive, which for some uses may also include repositionable or microspherical adhesive, solvent activated adhesive, and thermally activated adhesive), and a release liner in contact with the adhesive. The labels are formed from label stock on which the shape of the labels are cut into the label material, leaving a remainder portion of the label material called the matrix. The process of cutting out the label shapes from the label material (and sometimes including removing the matrix, leaving a label on a liner, and/or separating multiple width labels on a web into single width label webs) is called conversion.

Labels which are not provided to commerce (either to intermediate users or end users) with liners over an adhesive face, referred to in the art as linerless labels, are less expensive than lined labels, more labels can be provided in a roll of a given diameter than conventional labels with release liners, and they are more environmentally friendly since they do not require the disposal of liners after use. (For example, any adhesively coated liner stock that is provided in roll form with no liner between an adhesive surface and the display surface of a label is an example of a linerless label. Linerless labels should also be less expensive since one entire element (the liner) may be removed from the manufacturing cost of the label. Liners can constitute 35% to 50% of the total cost of a lined label construction. For these and other reasons, linerless labels are achieving increased popularity. Equipment for applying linerless with rewettable or thermal sensitive adhesives to a wide variety of moving elements (such as substrates, bottles, or packages) is fairly common, as shown in U.S. Pat. Nos. 2,492,908 and 4,468,274. However, the application of unlined pressure sensitive adhesive labels to moving elements although known in the art, is uncommon (e.g., U.S. Pat. No. 4,978,415), and does not have the versatility to apply the labels to all sorts of moving elements, such as envelopes, webs, bottles, cans, and packages.

According to U.S. Pat. No. 5,674,345, a method and apparatus are provided which quickly, positively, and in a versatile manner apply linerless pressure sensitive adhesive labels to moving elements. The equipment and method are versatile since they may be utilized with envelopes, packages, substrates, bottles, cans, packages and a wide variety of other moving elements, and the method and apparatus typically are practiced so as to leave no skeletal web after the labels are formed, thus avoiding any necessity of disposing of any waste label material According to the apparatus of that invention, means for mounting a supply of linerless label tape having a release coated face and adhesive (typically pressure sensitive adhesive) face is associated with a number of novel apparatus elements according to the invention. These novel elements include a non-stick circumferential surface feed roll, a hardened vacuum anvil cylinder cooperating with a cutting cylinder having a radially extending knife blade, which in turn cooperates with a wiper roller that applies liquid release material to the blade after each cut, and transport means having many unique features. The transport means includes a plurality of conveyor tapes which are spaced in a direction transverse to the direction of conveyance of labels thereby, and a vacuum chamber assists the adhesive from the labels in maintaining the labels in position on the conveyor tapes during conveyance. The conveyor tapes are typically substantially circular in cross section so as to present a minimal area for engagement with the label adhesive, and the labels are separated from the conveyor tapes by a plurality of non-stick surface stripper rings which extend upwardly above the top surface of the conveyor tapes, and are associated with a peeler roller which bends the labels upwardly as they are deflected by the stripper rings. From the peeler roller and stripper rings the labels are moved directly into contact with a moving element. Where, as typical, the labels are moved into contact with moving envelopes, the labels and envelopes pass through nip rollers whereby the pressure sensitive adhesive is activated.

Linerless labels have also become increasingly more popular because of the many advantages associated therewith. When any labels (including linerless labels) are used, it also is necessary to be able to automatically print the labels in a cost-effective manner. One way this can readily be accomplished is by using a thermal printer, either a thermal printer having a thermal printhead with a thermal ribbon unwind and rewind system, or a thermal printer with a direct thermal printhead. Conventional thermal printers are not capable of printing linerless labels, however, because there will be surfaces thereof which necessarily come into contact with the uncovered adhesive face of the linerless labels as the labels are being fed to the printhead, during printing, or afterwards. According to U.S. Pat. No. 5,560,293, a variety of thermal printers are provided which overcome this problem and are eminently suited for effective printing of linerless labels. The linerless labels printed according to the present invention may be almost any type of linerless labels, such as for example, thermal ribbon embodiments shown in U.S. Pat. No. 5,354,588 and direct thermal printer embodiments such as shown in U.S. Pat. No. 5,292,713.

U.S. Pat. No. 5,560,293 describes a thermal printer which prints linerless labels in such a way that printer components will not stick to the adhesive face of linerless labels. Substantially stationary printer components, such as a label guide, transport plate, front panel, and stripper blade, preferably have the adhesive face engaging surfaces thereof plasma coated so that adhesive will not stick to them. An optional cutter provided downstream of the stripper blade also has plasma coated surfaces. A driven platen roller has a surface thereof coated with or covered by a high release silicone, which will not stick to the adhesive, but has high friction characteristics to facilitate drive of the labels. In a direct thermal printer, a plasma coated tear off surface is downstream of the driven platen roller, and stripper belts, a second roller with O-rings, and the like are provided to prevent the labels from wrapping around the driven platen roller. One or more sensors may also be provided for controlling drive of the platen roller in response to the position of registration marks on the linerless labels. According to one aspect of that invention a thermal printer for printing linerless labels, having an uncovered adhesive face, is provided comprising the following elements: a linerless label unwind; a substantially stationary label guide; a substantially stationary transport plate; a rotatable driven platen roller; a printhead cooperating with the print roller; and, the label guide and transport plate having surfaces which engage the adhesive face of linerless labels from the label unwind, the adhesive-engaging surfaces comprising plasma coated surfaces which substantially prevent the label adhesive from adhering thereto. The printhead preferably comprises a thermal printhead, and a thermal printer unwind and rewind system is associated with the printhead that provides the thermal ribbon between the printhead and the driven platen roller. The driven platen roller preferably has a peripheral surface thereof which is coated with a high release silicone which has both non-stick characteristics with respect to the adhesive face of the linerless labels, but also high friction characteristics to facilitate driving of the labels. Any other substantially stationary surfaces of the printer which are also likely to come into contact with the adhesive face of the linerless labels-such as a front panel-are also plasma coated. The transport plate may be grooved to minimize the surface area that engages the label adhesive face. The printer also preferably comprises a stripper blade/bridge mounted on the opposite side of the driven platen roller from the label unwind, in the direction of label conveyance through the printer. The stripper blade/bridge is positioned with respect to the driven platen roller and the printhead so as to prevent a printed label from being wound onto the driven platen roller and assists the label moving from the platen roller to the cutter. The stripper blade/bridge has a surface which has a non-stick feature, preferably a plasma coating, and typically the stripper blade/bridge may be mounted directly on a pre-existing tear bar on the printer. According to that invention a conventional thermal printer may readily be modified merely by substituting the particular non-stick label guide, transport plate, and driven platen roller according to the invention, and mounting the stripper blade/bridge on the existing tear bar.

Linerless labels are produced, for example, by feeding a tape having a release coated face and an adhesive face to a hardened anvil vacuum cylinder, utilizing a non-stick circumferential surface feed roll. A knife blade on a cutting cylinder is rotated into contact with the tape at the anvil cylinder to cut the tape into linerless labels, and release liquid is applied to the blade after each cut. From the anvil cylinder the labels are deposited on a plurality of spaced conveyor tapes of circular cross section with the adhesive faces contacting the conveyor tapes. A vacuum chamber assists in holding the labels on the conveyor tapes. The release coat faces of the labels conveyed by the conveyor tapes may be heated and then printed with hot melt ink from an ink jet printer. The labels are separated from the conveyor tapes using a peeler roll and non-stick stripper rings, and then immediately contact a moving web or other elements to which they are to be applied, with the label and web passing through nip rolls to activate the pressure sensitive adhesive.

In spite of the benefits that are obvious from the proposed and actual use of linerless labels, the growth of the technology has not been as rapid in commerce as has been expected. The reduced rate of acceptance is due at least in part because the present capability of application equipment is significantly slower than for lined labels. In production and supply, faster rates without waste are critical to levels of efficiency, productivity and profitability. Significantly slower equipment, such as the present linerless label application systems which operate at speeds one fourth to one half the speed of lined label applicators, reduce cost competitive aspects of the linerless label. Additionally, the cost of equipment specific to linerless labels requires an independent capital investment for equipment which is useful only for the linerless labels. For a manufacturer to convert from a lined label process or to add a lined label process to his business, a completely new apparatus has to be purchased. At a cost of hundreds of thousands of dollars, this is not a highly attractive scenario for labeling companies.

According to the invention described in U.S. Pat. No. 6,206,071, a method and apparatus are provided which quickly, positively, and in a versatile manner apply linerless pressure sensitive adhesive labels to moving elements. The equipment and method are versatile since they may be used with any substrate, including for example envelopes, packages, bottles, cans, packages and a wide variety of other moving elements, may be used with any available linerless label, and the method may be used on existing commercial apparatus by the addition of an inventive module according to practice of that present invention. The process of that present invention comprises associating the linerless label with a temporary, reusable support (temporary, reusable liner) on line or immediately before introduction to the label application apparatus, stripping the label from the temporary, reusable support, winding up the temporary support, and reusing the temporary support again to support a linerless label for introduction into commercial lined label applicators with stripping capability.

U.S. Pat. No. 6,187,128 describes a method and apparatus for converting and applying labels. The apparatus includes a vacuum anvil roller and an idler roller that cooperate to separate the base stock (the label material and the liner) into its component parts (the label material or face web and the backing liner). A cutting roller cooperates with the vacuum anvil roller to butt cut the unlined face of the face web to form butt cut labels. A traction nip roller cooperates with the vacuum anvil roller to press the butt cut labels to the backing liner to form releasably-lined labels. The benefit of the process is asserted to overcome a problem with anvil cutting processes weakening or cutting the backing liner during conversion to releasably lined labels.

SUMMARY OF THE INVENTION

The present invention provides an alternative method of converting label stock (a label face web and liner) or linerless label stock (which can then be combined with conventional liner). The label application apparatus (both at he points of applying labels to liners and at the downstream sites where labels are applied to articles of commerce) may use lower weight (thinner) and therefore less expensive liner than can be used with conventional label conversion and application processes. Label web face (including linerless label webs) may be cut (the term "cut," unless otherwise limited, is defined as including any one of either a complete through cut, microbridged cut as defined herein, or perforated cut which includes all cuts intermediate a microbridged cut and complete through cut having no bridges between the label and the matrix) and then applied to a liner, the adhesive face of the label web face positioned against a release surface of the liner. Cut label is applied to liner stock (which may include a reusable, temporary liner support) before the cut label stock is applied by a lined label application apparatus or lined label application step. In this manner, the roll of liner(ed) stock or linerless stock material (on a temporary removable liner) may be provided to the ultimate customer of the printshop without that ultimate customer having to be concerned even with the addition of supplemental apparatus such as the component described in U.S. Pat. No. 6,206,071. The apparatus on site with the ultimate customer may not have to be modified in any way from the conventional apparatus used to apply conventional liner label stock. A preferred system includes novel apparatus that converts and applies labels to liners and ultimately apparatus that strips labels from liner and applies the labels to articles of commerce.

One unique element of an apparatus and process according to an embodiment of the invention is the use of a roller to secure a leading edge of a label while it is being cut or while it is still supported in an anvil/support roll nip. The securing of the leading edge (that is the edge most forward in the direction of movement of the label) provides a number of effects upon the label and the line that have not been appreciated, especially where the label is cut without a liner being present in contact with an adhesive face of the label material.

According to the invention, linerless label stock may be applied to a temporary (optionally reusable) carrier with the label shapes precut and then combined with a liner, including a thin liner. The framing segments of the cut-out labels are removed prior to, during or after application of the label stock to the temporary carrier. Printing of the labels may be done during manufacture of the label stock, after manufacture of the label material or stock, before cutting of the label material stock, after cutting of the label material or stock, before application of the label material or label stock to the temporary support or after application of the label material or label stock to the temporary, reusable support.

An additional process and apparatus for the practice of the present invention comprises a means for reducing the amount of work that has to be performed on a single line, separating the work onto different lines and even different locations which can reduce cross-contamination problems of materials used in different segments of the overall process. Particularly the invention allows for printing onto sheets which are cut into materials which form rolls of labels or printing onto the material and directly rolling the printed sheets. Then on a separate line (distinct from the printing line), adhesive (any form of adhesive, including by way of non-limiting examples, solvent activated adhesive, pressure-sensitive adhesive, repositionable adhesive, hot melt adhesive, energy activated adhesive, and the like) is applied to the face of the sheet away from the printing (or on the printed face if the label is to be applied printed surface down), preferably, but not necessarily before cutting into the roll width of the printed sheet. It is another surprising aspect of the invention that a thin liner may be provided to the label material after cutting of the label material, enabling the use of thin liner webs in a lined label, without the consequent waste or lack of quality that would be expected from use of thin liners. Because of the generally thin liner layer, the slitting or converting operation of a label on a thin liner might be expected to separate or wrinkle the layers. The (preferably printed) label material (sheet, roll or web) with adhesive is cut (e.g., die cut) into the shape desired for the label, the cut label moved through the apparatus with application onto a carrier or liner to form a fully assembled label supply web with a removeable carrier. The matrix is removed from the fully assembled label supply web prior to rewinding into a completed roll. The matrix removal may occur before (or after [preferable] lamination of the label material to the carrier. It is novel according to the present invention to form the roll in the order of printing onto the sheet, applying the adhesive, cutting the labels, and then applying the labels onto the reusable temporary carrier.

DETAILED DESCRIPTION OF THE INVENTION

Figure 1:
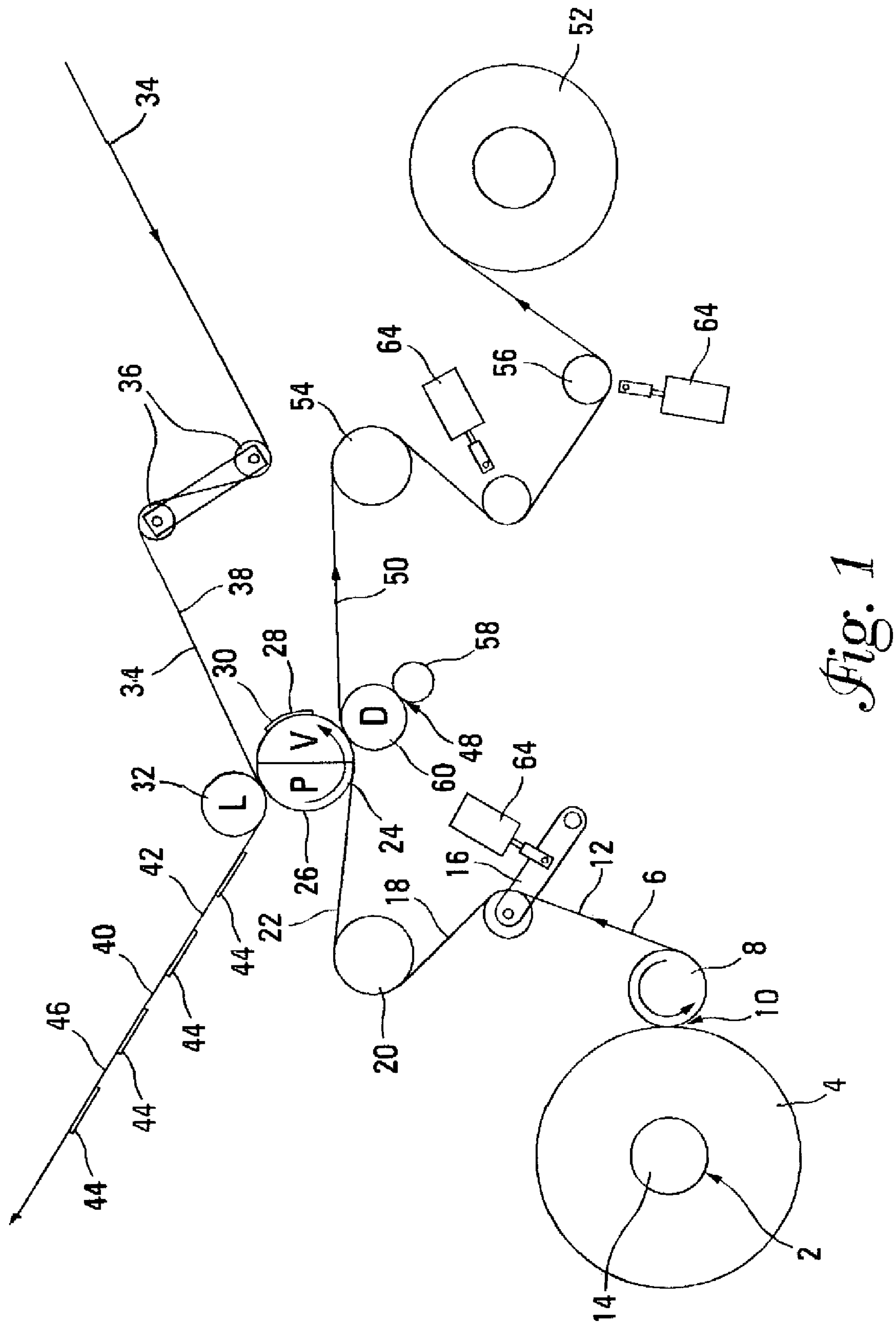
FIG. 1 shows a schematic of a module of a module or internal combination of subcomponents that can perform a process according to the present invention and can be a part of a commercial lined label applicator.

The invention relates to the use of labels on liner material, and may include and use any label material, whether on paper bases (both natural fiber paper and artificial fiber paper and blends thereof), polymeric film, metal foil and combinations of these materials. Much of the practice of the invention will be described with respect to linerless label, as that label material provided a beginning point for practice of the invention and was the most complex material with which to work. The emphasis on that particular label material is not intended to detract in any way from the broader scope of the invention, and the term should be viewed as exemplary rather than limiting. The steps described for use with linerless label may be used with other conventional label materials. The one difference would likely to be that conventional label material could be fed into the cutting step from a lined roll or complete label stock, the label material stripped or delaminated from the liner, the label material cut, and then the label reapplied or relaminated to liner web. Although U.S. Pat. No. 6,187,128 attempted to perform a delamination/relamination process using vacuum support of perforated label, the use of vacuum support is believed to have created difficulties, the process is not believed to have been commercialized, and the use of vacuum would not only fail to facilitate use of thin liner webs, it would actually deteriorate the final product with a thin liner web because of wrinkling stress applied to the thin face layer and the combined label stock.

One description of the present invention would include that of a method for forming a cut label on a liner comprising: feeding a web of label material to a cutting station and forming a cut label material having a surface area on a non-adhesive face of the cut label material; cutting the label material to provide a matrix adjacent a leading edge of the cut label and a trailing edge of the cut label, the distance between the leading edge and the trailing edge defining a length for the cut label; stabilizing the leading edge of the label material with respect to the matrix adjacent the leading edge before the trailing edge of the label material leaves the cutting station, the stabilizing being effected without vacuum being applied across an area comprising at least 50% of the surface area; feeding the leading edge of the label material and the matrix adjacent the leading edge of label material into a nip formed between a set of rollers; feeding a web of liner into the set of rollers.

Stabilization may be performed in a number of ways, without having to use vacuum over significant surfaces of the label surface area. The application of the vacuum over a significantly large surface area has itself been a significant reason for the failure of prior art systems. The vacuum can deform the liner material (even fairly permanently, by forming indentations). The cost of vacuum anvil rollers is quite high, and the vacuum anvil rollers often have to be replaced for each size of label that is to be cut to assure that the vacuum seal against each size label is secure. The use of different vacuum anvil rollers also increases the downtime for the equipment during job changes. It is possible to have a center line of vacuum on the anvil roller, or a distribution of holes along lines on the anvil that would cover small central areas of individual labels to stabilize them. For example, if there are 2, 3, 4, 5 or 6 labels to be prepared across an anvil width, there would be anvil rollers provided with 2, 3, 4, 5 or 6 lines of holes (respectively) distributed over the width of the anvil roller (e.g., the lines being parallel to the surface movement of the anvil roller) so that the labels may be applied over the anvil surface with only small or minimal areas of vacuum applied to labels and where even reduced vacuum may be applied (e.g., less then 10 cm Hg, less then 5 cm Hg and the like). It is preferred that no vacuum be applied, but reduced amounts of vacuum in combination with the other stabilization systems described herein could be used.

This redistribution of vacuum holes would effectively require that for some size labels, the surface area of the label over which the vacuum holes are distributed is less then 50% of that label surface area, less then 40% of the surface area, less then 30% of the surface area, less then 20% of the surface area, less then 20% of the surface area, less then 10% of the surface area, or even form a single line down the middle of the label. It is to be understood that these percentages of surface areas are the areas between the most distal holes affecting the labels. For example, if the holes were located midway between a center-line on the label and its edges, the area covered by vacuum would be 50% of the area of the label. If the holes were located 10% of the distance from the center-line to the edges, then 20% of the area of the label would be covered by vacuum. It is preferred that no vacuum be applied to the label during the stabilization of the label during cutting and then transfer to the liner, as described in the practice of this invention.

The stabilizing function is intended to stabilize against at least relative movement between cut label material and matrix formed by cutting of the label material. This can be performed by different methods and even different structures in the label material. Where the label stock is sever cut (that is, 100% of the edge of the label is completely cut from and severed from the matrix), the stabilizing function or procedure is the only factor stabilizing against this relative movement. Among the different methodologies that may be used to provide this function include, but are not limited to, perforation cutting, microbridge cutting (preferred), electrostatic charging of layers or surfaces to retain contact, pneumatic forces, surface tension forces, and more preferred, physical forces holding both the cut label edge and matrix edge steady relative to one another. A combination of the use of physical force (particularly when provided by nip rollers or a nip between rollers) and microbridging is also highly preferred. A preferred method includes stabilizing at least the leading edge, wherein stabilizing is performed without any vacuum being applied to to the label material. The stabilizing force may be applied by a physical element pressing the leading edge against a surface of a roller. The physical element is preferably a roller. The roller may be a separate pair of nip rollers or may be a single roller forming a nip on the surface of the anvil roller. These alternatives will be shown in greater detail in a discussion of the Figures.

The cutting of the label material may be effected with any cutting device, although some are known in the art to be more suitable or desirable then others. For example, the cutting may be performed by a laser cutter, an anvil roller and die cutter, air jet cutter, a water jet cutter, an anvil roller and hammer die cutter, and the like.

The method of stabilizing with rollers can be practiced by identifying a distance, between a location on the anvil roller where the trailing edge is cut and a stabilizing nip for stabilizing relative movement between the cut label and the matrix, and assuring that this distance is approximately less then or equal to the length of the label. The label material may be provided by stripping liner from label material.

These methods enable the use of ultrathin or ultralight liners. This capability has never been enabled before in the art. This can create significant savings to the industry, as the cost of many sheet materials is primarily dependent upon the amount of material used. Particularly, the avoidance of vacuum securement should be practiced where the materials are thinner and lighter, as the thinner and lighter materials may be more readily deformed than would be thicker and heavier materials. The sizes of these thin and weights of these lightweight materials are discussed more thoroughly elsewhere in the text. Preferred thicknesses however are less then 1.02 mil, less then 0.93 mil, less then 0.75 mil, less than 0.65 mil, less than 0.50 mil, and equal to or less then 0.30 mil or 0.25 mil thick liner (respectively less than 0.026 mm, 0.023 mm, 0.0186 mm, 0.016 mm, 0.013 mm, 0.0078 mm or 0.0064 mm), particularly polymeric liner, and more particularly polyester liner (e.g., polyethyleneterephthalate or polyethylenenaphthalate film).

One embodiment of a method for forming a cut label on a liner according to the invention may also be described as comprising first feeding a web of label material to a cutting station forming a first nip between an anvil roller and a die cutting roller. The label material is then cut (perforated, microbridged or sever cut) to provide a leading edge of the cut label and a trailing edge of the cut label, the distance between the leading edge and the trailing edge defining a length for the cut label. The cut label is fed to a second nip formed by rollers, and a web of liner is fed into the second nip formed by rollers. Where the nip rollers are stabilizing movement between the cut label and matrix, the distance between the first nip and the second nip should be approximately less then or equal to the length of the label. The method may be practiced wherein the second nip is formed between the anvil roller and a stabilizing roller, and preferably wherein no vacuum is used to support cut label on the anvil roller.

The practice of the present invention enables separation of liner from label material, cutting of the label material, and relamination of the cut label material to the liner or to new liner, without the use of vacuum. Original label may also be cut and fed to original or reusable liner stock. Where a microbridged cut is used on the label, the cut should comprise a cut wherein less than 5.0% (even less then 4.0%, less then 03.0%, less then 1.0%, less then 0.5%, and even less then 0.2%) of the total border retains material that bridges the label and its matrix, and no single bridge element comprises more then 2% or more then 1.0% % of the linear border distance (preferably less then 0.30% %, less then 0.20% %, less then 0.10% %, and even less then 0.05% %).

An embodiment of the invention may include either applying labels to a substrate wherein after forming the label stock according to the method of claim 1, individual labels from the microbridged label are removed from the liner, leaving a matrix of label material on the liner, and the individual labels are applied to a substrate, or wherein after forming the label stock, the matrix from the microbridged label is removed from the liner, leaving cut labels of label material on the liner, and the individual labels are subsequently applied to a substrate. This can be used to form a source of labels comprising a composite of an elongate sheet of temporary liner with a thickness of less than or equal to 0.0259 mm or 1.02 mils and having adhered to a low adhesion surface of said temporary liner an adhesive face of the label material, said composite being in a roll. The source of labels may be with the label material being cut label material, including sever cut, microbridged cut and perforated cut label material.

Liners other then polymeric liners may also benefit from the practice of the present invention, and the reduced cost and increased performance of the liners (e.g., permanent and temporary, reuseable and disposable liners) may be alternatively or even more appropriately described by parameters other than thickness. For example, release coated or treated fiber-based liners may be characterized in terms of weight per square meter. For example, standard high quality glassine liner (which may still be used in the practice of the invention) is commercially available in standard properties of about 60 $g/m^2$ (about 53 microns or 2.1 mil). The benefits of the invention enable the optional usage of lower weight glassine (or other supercalendered papers, with or without absorbed or coated release materials or other treating materials) with provided weights of 55 $g/m^2$ or less, 50 $g/m^2$ or less, 45 $g/m^2$ or less or even 40 or 30 $g/m^2$ or less. These lower weight supercalendered papers would have thicknesses more on the order of less then 2.0 mils (0.051 mm), less then 1.7 mils (0.043 mm), less then 1.5 mils (0.038 mm) and even less then 1.2 mils (0.031 mm).

Another form of release liner is commercially available and referred to a Supercalendered Kraft paper (SCK paper). This is usually provided as 40 pound stock (88 Kg/ream) at about 2.5 mils (0.064 mm) per sheet thickness. The practice of the present invention would enable the use of lighter and thinner liner saving significant costs. Thicknesses of less then the standard 2.5 mils (less then 0.064 mm), less then 2.2 mils (0.060 mm), less then 2.0 mils (0.051 mm), less then 1.8 mils (0.042 mm), and even less then 1.2 mils (0.031 mm) would be useful in the practice of the present invention, while they are not be to be safely usable in prior art label application processes.

Still another format of liner that can be used in machine finished papers (MF papers). Standard commercial weights are as 50 pound (110 Kg) stock with thickness of about 3.4 mils (0.09 mm) per sheet. The practice of the invention would enable the use of thickness of MF paper of less then 3.4 mils (0.09 mm), less then 3.0 mils (0.077 mm), less then 2.6 mils (0.067 mm), less then 2.2 mils (0.060 mm), less then 2.0 mils (0.051 mm), and even less then 1.2 mils (0.031 mm).

Polymer coated papers, especially polyolefin (e.g., polypropylene and/or polyethylene) coated papers are also commercially available with weights of about 40 pound (88 kg) stock and traditional thickness of about 2.5 mils. Thicknesses of less then the standard 2.5 mils (less then 0.064 mm), less then 2.2 mils (0.060 mm), less then 2.0 mils (0.051 mm), less then 1.8 mils (0.042 mm), and even less then 1.2 mils (0.031 mm) would be useful in the practice of the present invention, while they are not be to be safely usable in prior art label application processes.

Linerless label tape conventionally has a label substrate, a release coated face and an adhesive (typically pressure sensitive adhesive, although thermal adhesives and solvent activatable adhesives are known) coated face. Linerless label is usually provided in roll form or stacked form, with the adhesive face of a sheet or roll in contact with the release coated face of another sheet or the adjacent rolled layer. The label is cut, partially cut or precut directly from the roll or sheet in the stack and applied to a substrate or element on which a label is to be applied. It is common in the art for the linerless label to be cut by a die, especially a cylindrical die, before the label is sent to the article to which the label is to be applied. The primary objective of the linerless label with respect to the more conventional lined label, is to eliminate the necessary step of disposing of the liner after the label is applied. This disposal is inconvenient, adds to the cost of the user, and usually increases the cost of the label material, since there is another layer of material which is present in any form of a linered label. Regular label stock has been cut through the label and through the adhesive, with an effort to minimally contact and not damage the liner. Moving label stock at rates over 50 m/sec. requires very precise equipment and little variation in materials to enable successful cutting and minimizing waste and damage because of insufficient cutting or excessive cutting of the liner. The method described in U.S. Pat. No. 6,187,128 is an attempt to overcome those deficiencies, but which because of the necessary use of vacuum support of the label material and especially the cut label material has not proved satisfactory to the inventors and is not known to have been commercialized.

As previously noted, however, the use of linerless labels has been restrained by the need for additional capital expenditure as well as inefficiencies in the performance of the apparatus designed for linerless label application. The present invention addresses and reduces both of these concerns as an alternative to the apparatus, articles and methods of U.S. Pat. Nos. 6,206,071 and 6,294,038, and the additional problems found with attempts at performing U.S. Pat. No. 6,187,128.

The present invention may be practiced in two ways. First, an apparatus may be constructed with the built in capability of temporarily securing a delaminated label or linerless label to a temporary (preferably) reusable support. Second, a module may be provided which can be attached to existing lined label applicator machines which enables those lined label applicators to apply linered labels made according to the practice of the invention. Lined labels are applied to substrates or elements by feeding the lined label stock with liner into an applicator. The applicator may receive die-cut lined label stock or provide die cutting within the applicator itself. The label, after die cutting is stripped from the liner by a stripping element (e.g., blade, reduced pressure, scraper, flexer, peeler, bender or the like) and the shaped label (that is, a label shaped by the die cutting) is applied to the surface on which a label is desired. These systems for application of lined labels are readily available from various manufacturers and perform quite efficiently. The module of the present invention effectively creates a temporarily lined linerless label or normal linered label, removes the temporary liner, and then preferably recycles the liner. By recycling the liner, which may be the same as or slightly modified from conventional liners, the disposal of liners is significantly reduced. By recycling a liner once, the costs of material and disposal for the liner are reduced 50%, and by recycling the liner the expected twenty or so times, the cost of the liner is reduced by 95%. Even by recycling a liner merely three times, which can be readily done with conventional label liner materials, the cost savings in materials and disposal for the liner is 75%. As can be seen from the cost efficiencies, only modest numbers of recycling need be done to provide significant economic advantage and significantly equivalent reductions in waste disposal costs. It is not essential to the practice of the present invention to recycle these liners, however.

It is important to note that there are unique capabilities provided to the field of the invention and the commercial potential in the practice of the invention through the use of thin backing sheets. The practice of the invention also uniquely enables the manufacture of unique structures, which are not known to be enabled by any other process.

To begin with, the term "thin backing sheet" or "thin liner" has a definite meaning within the practice of the present invention. In ordinary practices, backing sheets will normally be at least 1.50 mils (0.0015 inches or 0.038 mm). This is especially true where mechanical processing, such as rotary die cutting of label stock supported on the liner, is to be performed. This significant thickness is required because the cutting operation is neither precise nor tolerant of thin layers. Wobble of layers and equipment, the essential need to assure that the facing stock is uniformly and completely cut through, wear of materials, wrinkles and folds, and other physical variables cause the die cuts to vary significantly. The process is operated with tolerances assuring that the die cut always goes completely through the stock and backside adhesive, and this means that it will also almost always penetrate into the liner. To assure that the liner is not cut all the way through and therefore cause the sheet to fall apart as there would be no continuous structural layer, the liner must be thick enough (e.g., at least about 0.038 mm) to assure that the die edge cuts into the liner, but does not cut all the way through the liner. Therefore a thin liner or thin backing sheet means a liner that is less than or equal to 1.02 mils (less than 0.0254 mm). Preferably the liner is less than 1 mil (less than 0.0254 mm), more preferably less than 0.8 mil (0.0203 mm), less than 0.6 mil (less than 0.017 mm), and even as low as 0.25 mil or lower (0.00626 mm or lower). A preferred range is less than 1.0 mil (less than 0.0254 mm), less than 0.9 mil (less than 0.023 mm) between 0.3 and 1.0 mil (0.0076 through 0.0254 mm), 0.4 and 0.8 mils (approximately between 0.01 and 0.021 mm). Such thin backing material is commercially available as Hostaphan® polyester film (a registered trademark of Hoecsht AG) (e.g., 0.5 mil, 0.0127 mm, Tradename 2SLK silicone coated film) sheeting from Mitsubishi Chemical Company and is known to be used as throwaway liner on tar adhesive roofing shingles. A related liner material is provided by Avery, Inc. as a 1.02 mil (0.026 mm) polyester backing sheet with a 1.25 mil (0.032 mm) adhesive layer.

The composition of the backing sheet may be any polymeric or even thin paper layer, such as polyester (e.g., polethyleneterephthalate, polyethylenenaphthalate), polyamide, polyvinyl resin, polyvinyl acetal resin, cellulosic resins (such as cellulose acetate, cellulose triacetate, etc.), and artificial papers, especially translucent/transparent compressed paper layers of the appropriate dimensions. Natural resins such as amylose resins may also be used. The surface of the layers may be physically or chemically treated to control its adhesion to the adhesive surface on the liner. Release layers, controlled release layers, and the like such as silicone resins, acrylate resins, epoxy resins, and mixed resin functionalities can be used as extremely thin coatings on the liner to control these properties as can corona discharge, sputtering, oxidation, laser discharge, or chemical reaction of the surface.

There is a definite technical problem in attempting to use a thin liner layer on label stock or linerless label stock. That technical problem arises, at least in part, from attempting to cut or die cut the label on the backing. As noted above, the cutting lacks the precision needed to cut consistently through the label without cutting through the liner. The liner is so thin that there is a regular occurrence of liner cut-through when the liner is used at commercial label converting speeds. Even when the die cutting speed is slowed on line to 25 feet (7.63 m) per minute, which is an extremely slow manufacturing speed, there is still some cut-through likely on line. As normal manufacturing processes for labels are sought to be at least 100 feet (28.6 m) per minute, and preferably at least 150 ft./min (42.9 m/min.) having to slow the process down to one fourth of standard speeds is a significant cost disadvantage. The present process enables a process to be practiced that can manufacture labels with thin liner, and completely avoid any potential for cut-through of the liner. This is a significant technical advance. Even if the use of thin liner is tried in the vacuum process of U.S. Pat. No. 6,187,128, the vacuum is capable of distorting or wrinkling the liner (e.g., even if indirectly), slows down the process and has been found to adversely affect the overall consistency and continuity of the process.

Another technical problem that arises is because of the speed of manufacturing that must be used to make the product more economical. As the speed increases, the likelihood of cut-through damage on normal label material increases dramatically and the probability of thin label distortion increases. Speed adds reduced alignment stability, reduced layer stability, less accuracy in the die-cutting, and the likelihood of stoppage of the manufacturing line is increased to address deficiencies. The process of the present invention, by completely eliminating even the possibility of cut-through damage, and by stabilizing both the cut label and the liner web enables the potential for increased speeds, even beyond those of standard label manufacture or application systems.

The basic practices of the invention that enable these manufacturing improvements have advantages even beyond application to thin liners. One of these practices includes the use of 'small-perfing,' 'micro-perfing' or 'micro-perforation' of the label stock before application of the cut label stock to the liner. The use of a "cut-label stabilizing bar" also enables the use of completely sever-cut label material in the process prior to application of the liner web to the cut label material. The procedure referred to above as micro-perfing is more accurately termed 'microbridging.' The use of micro-perforation or microbridging techniques (which will be described in greater detail herein) provides a label that has been sufficiently cut in the desired pattern for separation into individual labels without the need for additional treatment (e.g., burr removal, trim cutting, etc.) and yet maintain the aesthetics needed for a high quality label and does not require additional stabilizing techniques between the matrix and the cut label. At the same time, the maintenance of a precut label sheet that can still be handled with a mechanical or manual system without difficulty is a significant advantage. Once a label stock sheet has been precut to form the shape of the labels, the labels would ordinarily (in past processes) fall off the matrix, slip with respect to its alignment between the cut label and the matrix or have to be separately treated (as by process damaging vacuum support). The ability to be able to prevent the separation of the cut label from the matrix, slippage between the matrix and the cut label or removing the label from the matrix prior to or at the same time or immediately after lamination of the cut label to the liner is a significant advantage in and of itself, and can be a significant factor in the enablement of the use of thin liners.

The term micro-perfing, microbridging or micro-perforation as used in the practice of the present invention has a definite meaning according to the present invention. When a label is ordinarily cut from label stock or sheeting, the entire periphery of the label design is cut out, the label removed (without further tearing around the border), and the label applied to a product surface. Microbridging or Micro-perforation includes a process where less than 5% (preferably less than 2%, more preferably less than 1%) of the periphery of the intended outline or border of the label is left uncut in sections or bridges between the edge of the label and the matrix, with no single bridge exceeding 2% (preferably less than 1%, more preferably less than 0.5%, and still more preferably less than 0.1% or less than 0.05%) of the total border or where there are only single edges cut (with natural sides forming an edge of the label),as measured along the one or two connecting side (s) between labels cut from the same stock. The absolute dimensions of the bridges may also be defined. For example, each bridge should have a maximum dimension perpendicular to the direction of the border edge that is less than 1 mm, less than 0.8 mm, less than 0.6 mm, less than 0.5 mm, less than 0.4 mm, less than 0.3 mm, or less than 0.1 or less than 0.08 mm, for example, down to 0.05 mm. These small bridges are able to support a label within a matrix from the label stock (the matrix being a residue of label material that is usually disposed of after the label is removed), so that the entire stock (of matrix attached through bridges to the label) can be manipulated or operated on and transported, without having to treat the labels individually. There are usually at least two bridges, usually more than at least three bridges, and more usually four or more bridges around the microbridged label. It is preferred that there be 10 or fewer bridges, 8 or fewer bridges, and 6 or fewer bridges in the practice of the invention, with the labels running on average from 25 $cm^2$ to 1000 $cm^2$.

Micro-perfing, micro-bridging or small-perfing can be effected quite easily by the selection of appropriate dies in the die cutting procedure. Ordinarily, a die or die hammer or die set is designed or positioned to have the entire outline of the intended cut to be represented on one or more die parts as a complete and continuous edge. When the die is pressed against the surface to be cut, the edge will cut the label stock, and where there are openings in the die cutting-edge, a bridge will remain. This can be seen in reference to FIGS. 3 and 4.

Figure 3:
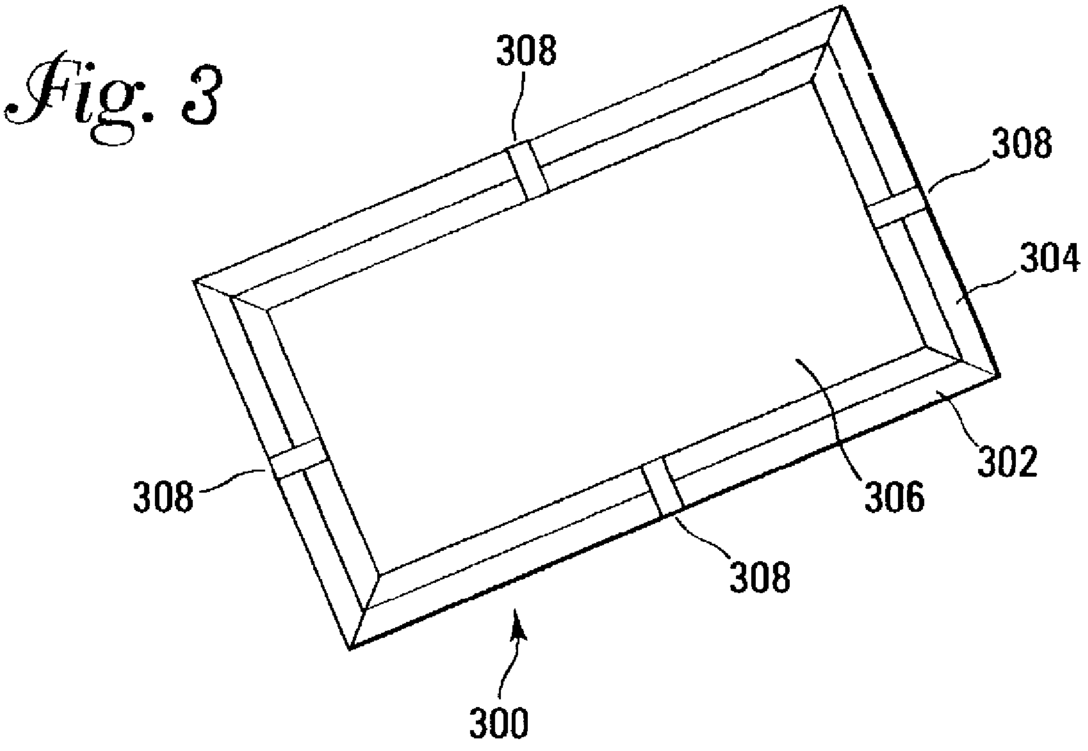
FIG. 3 shows a perspective view of a die with a micro-perforating design for cutting borders around labels.

As shown in FIG. 3, a rectangular die 300 is shown. The die 300 has a base 302, a raised sharp edge 304 and a floor 306. Gaps 308 are shown along the edge 304. These gaps 308 cannot cut into a label material and leave a bridge along the border cut into the label.

Figure 4:
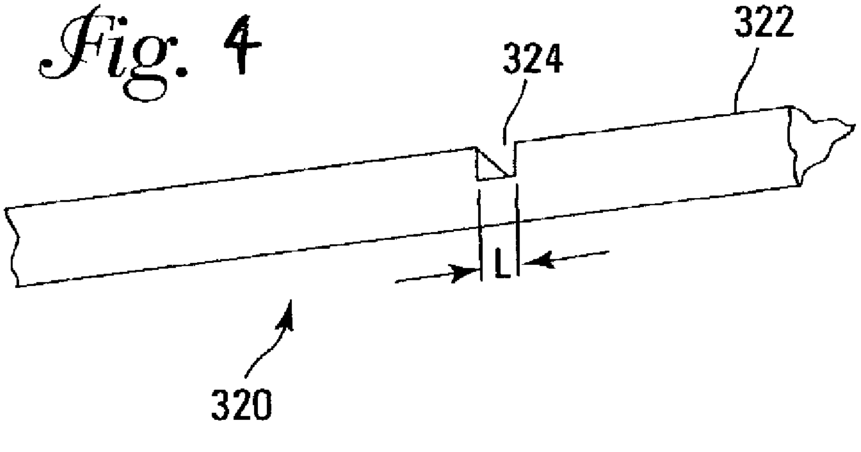
FIG. 4 shows a cutaway view of an edge of a die with a micro-perforating opening in the die edge.

As shown in FIG. 4, a raised die edge 320 is shown. The raised edge 320 has a cutting edge 322 with a gap 324 along the edge. The gap 324 cannot cut through a label when the die 320 is pressed against the label. The length L of the gap 324 will determine the dimension (width) of the microbridging along the line of the cut made to effect the separable border in the label. As noted elsewhere, the width or length of the gap 324 may range from less than 1 mm, to less than 0.8 mm, to less than 0.6 mm, to less than 0.5 mm, to less than 0.4 mm, to less than 0.1 mm and may be as small as enables the bridge formed in the cut to stabilize a label within the matrix, particularly in combination with a number of microperforation bridges or microbridges around the circumference or border of the pre-cut label within the matrix.

The term 'microperfing' is incidentally used or described in U.S. Pat. No. 4,945,709, although it is apparently used in the context of forming small holes in a material, as opposed to forming small bridges along a die cut or other cut along a border. U.S. Pat. No. 5,076,612 describes microperfing completely differently as printing paper marketed as "Microperf". Such a known technique may be used to define edge portion 44 of a predetermined width, e.g., conveniently in the range ⅓-1 inch by providing fine closely-spaced perforations along line 48. In that case, the bridging material constitutes the majority of the border. U.S. Pat. Nos. 6,261,252 and 6,106,492 describe 'microperf' as a small cell foam.

Perforating is used quite extensively in label manufacturing, with even conventional postage stamps being considered a form of label. In these cases, a very large portion of the broader is retained (in the case of stamps, this percentage usually runs between 25 and 60 percent of the border being opened or perforated), with the bridge segments being approximately equal. The individual and equally sized bridges in these cases may constitute as much as 3-10% of the total border between adjacent stamps or sections.

Microbridging according to the present invention is performed by having a hole along the continuous line of the cutting edge of the die. The number and size of the holes determines the area that is not cut by the die and remains as a micro-bridge in the microbridged label edge.

That invention may at least in part be described as a module for adapting apparatus which strips liners from a label and applies labels to a substrate, the module enabling the apparatus to apply a) delaminated label material or linerless labels, the module comprising:

a source of label stock or linerless label sheet, a source of liner sheet (from the label stock or separate from the linerless label), a roll for guiding the label stock or linerless label sheet after removal from the source of linerless label, in the case of label stock, a delaminating section where the liner web is separated from the label stock, and in the case of linerless label, a separate source of liner web, a die cutter and an anvil roller defining an area through which label sheet (without a liner attached, either as original linerless label or as delaminated label material from conventional label stock) may move between said die cutter and anvil roller, a laminator roller adjacent to the anvil roller defining an area between the anvil roller and the laminator roller through which both liner sheet and cut-out labels from the label sheet may move between the anvil roller and the laminator roller to form a temporary support of the liner for cut-out linerless label. The label moves in a direction of treatment, with the forward edge referred to herein as the leading edge and the rearward edge referred to as the trailing edge. The leading edge is the first portion of the label material that is cut by a roller anvil die, and the trailing edge is the last portion of a label cut by roller anvil die. While the trailing edge is still compressed or restrained by the nip between the anvil roll and the die cutting roller, the leading edge is compressed or restrained by a stabilizing roller against the anvil roller. There should be at least one stabilizing roller or there may be a series of two rollers. In the one roller format, the stabilizing roller would also act as the laminating roller. In a two roller format, the first roller would act as a stabilizing roller and could partially or loosely laminate the liner and the cut label, or merely support or stabilize a non-laminated association of the liner and the cut label, passing that association to a laminating roller while the first stabilizing roller is in contact with each label (e.g., the trailing edge) while the laminating roller begins lamination of the label (the leading edge) and the liner web. The distances between the supporting or stabilizing roller must always be such that there is at least some pressure applied between the cut label and the liner at both the trailing edge and the leading edge during the transition from cutting to stabilization, cutting to laminating, and stabilizing to lamination (which may be effected by the die/anvil roller and the one or two additional rollers, as explained above). The roll for guiding the linerless label web from the wound roll may, for example, comprise a top riding roller. Between the roll for guiding the linered label or linerless label and the anvil roller and die cutter, there may be a tension controller, such as a dancer, pneumatic or hydraulic tension controller, spring tension controller, and the like. The die cutter may be, for example, a reciprocating die cutter, hammer die cutter or a die cutting roller and anvil. In the operation of the module and apparatus, a matrix may be formed from removal of cut-out labels from the cut liner material or linerless label sheet and the matrix is wound on a take up roll. The module may be constructed as a single free-standing module within a frame or housing which may be attached to said apparatus. The free-standing frame or housing may have feed sources of the liner and/or the linered label or linerless label separated from the module or as separate independent modules or elements attached to or associated with the module where the linerless label sheet or label material is cut and secured to a temporary, preferably reusable support or liner. Where a laser cutter is used, and there is no restraining pressure provided by the laser cutter, the stabilizing nip or stabilizing bar should be in stabilizing contact with the cut end of the label before the cut at the trailing end of the label is completed. This is most important when the path of cut label travel carries the cut label over a curved or arcuate surface and bending would promote separation between the cut label and the matrix. Even on a flat traveling surface, stabilization is desirable.

Where an anvil roller is used, the anvil roller may have openings on its surface through which reduced gas pressure (vacuum) may be applied to hold cut-out label as the anvil roller turns, but as noted earlier, this has proved detrimental, even though the stabilizing roller ameliorates problems caused by the vacuum against unsupported/unstabilized cut label. To reduce any tendency of the die cutter to build up adhesive or other material on its surface, a lubricant may be applied to the die cutter, as by a lubricator applicator or supplier of lubricant or antistick liquid. An important contribution according to the invention is to use a chilled die cutting system, either or both of the cutting element and/or the supporting element, such as the rotary die, flat die, hammer, anvil, or the like.

In U.S. Pat. No. 6,294,038, an apparatus for applying labels to the surface of elements was created by positioning the module or multiple modules described above to feed a composite article comprising a temporary combination of said liner (e.g., temporary, reusable liner) and the cut-out label and the apparatus including a separator or splitter (later described) for removing the cut-out label from the temporary liner. The apparatus may also include a winding element for winding into a roll a matrix comprising liner from which cut-out label has been removed. An apparatus is also provided for applying labels to the surface of elements, the apparatus comprising the module of the present invention positioned to feed a composite article comprising a temporary combination of said liner and said cut-out label and said apparatus including:

a) a separator or splitter for removing cut-out label from a temporary liner, b) a winding element for winding into a roll a matrix comprising liner from which cut-out label has been removed, and c) a registration guide for label web between said roll for guiding said label web or sheet after removal from the source of label. The apparatus may provide the roll for guiding the label as a top riding roller, and between the roll for guiding the label and the anvil roller and die cutter, there may be a tension controller, and the die cutter may be a die cutting roller, and a matrix is formed from removal of cut-out labels from the label sheet and the matrix is wound on a take up roll. The anvil roll, as noted should not have reduced pressure or vacuum applied to support the cut label, although some may be provided as the liner movement and wrinkling capability is reduced by the stabilizing roller. The stabilizing roller (or stabilizing laminating roller) must contact the leading edge of the cut label while the die cutting roller maintains compression on the trailing edge of the cut label. This contact on both ends of the cut label provides the stabilizing effect as the cut-out linerless label is transported to the laminator roller. The compression on both ends of label may be released on the trailing edge once the pressure on the leading edge stabilizes the relative movement (prevents relative movement) between the cut label and the liner. This apparatus may have the inventive subcomponents or module (the delaminator, anvil/die cutter, and relaminator with stabilizing roller) as a single free-standing module within a frame or housing which is attached to the apparatus. The apparatus may provide reduced gas pressure (vacuum) at other portions of the web travel paths to stabilize movement, but it is not needed and at least les preferred to hold cut-out label as the anvil roller turns. The present invention can eliminate some of the structure in this process, for example, eliminating the vacuum support for the label, as the microperfing now enables the precut, micro-perforated label stock to be transported with the label attached by bridges to the matrix and the stabilizing roller even enables a complete sever-cut (all edges of the label shape are completely cut through) as the roller can support both the cut label and the liner together without movement between them.

The present invention would also allow the use of laser cutting in the process, with the trailing edge of the label not being completely cut through until the leading edge is gripped or compressed by a stabilizing roller and a support roller.

A method is also described in U.S. Pat. No. 6,206,071, for enabling a lined label applicator to accept linerless label sheet for application to the surface of elements comprising securing a module of the invention to a lined label applicator so that a composite of:

a) liner sheet as a temporary liner sheet and b) cut-out linerless labels from the linerless label sheet is fed into a lined label applicator where lined label is normally directed in the lined label applicator. A method of applying linerless labels to a substrate after enabling a enabling a lined label applicator to accept linerless label sheet for application to the surface of elements is also described wherein cut-out linerless label is removed from a temporary liner sheet, and the cut-out linerless label is applied to a substrate. This method may be further practiced whereby after removal of cut-out linerless label from the temporary liner sheet, the used temporary liner sheet is wound into a roll. Afterwards, the roll into which said temporary liner sheet is wound is used to feed liner as a source of liner sheet in a module comprising:

a source of linerless label sheet, a roll for guiding linerless label sheet after removal from the source of linerless label, a die cutter and an anvil roller defining an area through which linerless label sheet may move between a die cutter and anvil roller, a laminator roller adjacent the anvil roller defining an area between the anvil roller and laminator roller through which both liner sheet and cut-out linerless labels from the linerless label sheet my move between the anvil roller and the laminator roller to form a temporary support of the liner for cut-out linerless label, wherein a roller must maintain pressure between the cut label and the liner at all times between cutting of the trailing edge of the label and lamination of the leading edge of the cut label to the liner.

It is also desirable, as an alternative in the present invention, to provide a prerolled (and preferably preprinted) source of microperforated, partially separated or partially segmented linerless labels on a temporary support, which may or may not be a recyclable temporary support or a thin support. The source roll itself is also novel, as an adhesive-backed label, with a release coating on the surface to which the adhesive on the backing will not adhere, with micro-perforation bridges supporting the label to a matrix has not previously been provided on a liner, including a thin liner and a temporary, reusable liner.

The novel supply roll may be produced in a number of different ways, depending upon the manner in which the supply may be ultimately used. Among the more useful methods of constructing this format of pre-rolled linerless labels are:

1) providing a stream of linerless labels (e.g., with the adhesive coated thereon) off the manufacturing line, before being rolled, partially severing individual labels on the continuous sheet with the micro-perorating process of the invention, and applying the continuous sheet with the partially severed labels to the temporary support, and then rolling the label/support composite, with or without a core support;

2) providing a stream of linerless labels (e.g., with the adhesive coated thereon) off the manufacturing line, and before the label stock is rolled, partially severing individual labels on the continuous sheet through the micro-bridging techniques of the invention, and separating the labels from the cutoff framing segment(s) with the individual linerless labels spaced and supported on the reusable support, then rolling the micro-perforated label/support composite, with or without a core; the labels may be separated from the frame segment(s) before, during or after application of the labels so the temporary support (in any of these listed alternatives);

3) providing a roll of linerless labels, unrolling the linerless labels, or partially forming or severing the individual labels by micro-perforation or micro-bridging techniques and associating the stream of labels (with or without the framing segment(s) with a temporary support, removing the framing segment(s) from the linerless label continuous sheet before, during or after association with the temporary support, except that the labels are partially severed on the temporary support, and then applying the individual label/support composite to a label applicator or rolling the label/support composite into a roll (with or without a core) before introduction to an applicator. By partially severed it is meant that the labels are shaped, but that some bridge remains between the label shape and the matrix; and 4) providing a roll of label stock (preferably preprinted), delaminating the label material from the liner, cutting the label (with perforation, microbridging or complete sever-cutting) and a roller maintaining pressure between at least a portion of the cut label and the liner at all times between cutting of the trailing edge of the label and lamination of the leading edge of the cut label to the liner until the label has been secured to the liner. The matrix may be conveniently removed during the process according to standards methods.

In the practice of these three methods, a number of alternatives and options may be used. The labels or linerless label stock may be printed at any time, such as before application of the adhesive, before or after severing of the individual labels, before or after separation of the labels from the framing segment(s), or before or after application of the linerless labels to the temporary support. With thin liner, it is highly preferred, if not required, to print the labels before they have been applied to the thin liner.

The linerless label sheet or individual labels may be applied to the temporary support, may be partially severed or partially cut into micro-perforated individual labels, may be printed, and may be subsequently applied to surfaces in any other way processed on commercially available equipment, and in similar processes as lined labels are treated. Once the roll or stream of linered label or linerless labels on temporary support material composite has been formed, it may be used in a manner similar to the linered label linerless labels/temporary support composite manufactured in line as described above. The composite may then be fed into a conventional label applicator.

A method for enabling a linered label applicator to accept linerless label sheet for application to the surface of elements according to this invention may be described as comprising associating a source of microbridged, partially precut labels or completely sever-cut labels on a roll of reusable liner sheet to the label applicator so that a composite of:

a) the reusable, temporary liner sheet and b) micro-bridged or through-cut cut-out linerless labels is fed into the label applicator where label is normally directed into the label applicator. The cut-out label may be removed from the temporary liner sheet, leaving the matrix behind by severing the micro-bridges by tearing, and the cut-out label is applied to a substrate. After removal of cut-out label from the temporary liner sheet, the temporary liner sheet would normally be wound into a roll, and may or may not be reused. After the temporary liner sheet is wound into a roll, the roll is unwound and linerless label may be applied again to the liner sheet to use it as a reusable, temporary liner sheet. After the roll is unwound and label is applied to the temporary liner sheet to form a recycled roll, supported label from the recycled roll is fed into the linered label applicator where linered label is normally directed into the linered label applicator. The roll is used to feed label on a reusable, temporary liner as a source of label, with the applicator normally operating by steps in the applicator comprising:

bending the label on a temporary liner to partially remove at least a part of an edge of the label from the temporary liner, having at least the lifted edge placed into contact with a surface to which the label is to be applied, and attaching the label to the surface.

As with the label/temporary support composites manufactured in line, the temporary support is stripped from the labels in the applicator leaving the matrix behind by tearing the bridges formed by the micro-perforation process, the support rolled, and the support unrolled and new labels or label stock applied thereto.

Another way of providing rolled sheet material according to the present invention comprises a method for creating a label on a temporary reusable carrier comprising the steps of:

a) printing an image onto at least one face of a first sheet material;

b) applying adhesive to at least one face of the printed first sheet material;

c) pre-cutting the sheet material into individual labels by perforating, microbridging or sever cutting to leave bridges or no bridges between the labels and a matrix, while maintaining pressure between the cut label and the liner at all times between cutting of the trailing edge of the label and lamination of the leading edge of the cut label to the liner.;

d) applying a face of the individual labels to a temporary carrier sheet to form a sheet of label stock; and e) rolling the sheet of label stock into a roll of label stock or using it within an applicator for linered labels.

This method will usually have label stock from the roll of label stock fed into a label applicator, where labels from the label stock are applied to substrates, and the temporary carrier is collected as a roll, with the matrix attached or with the matrix separately stripped from the carrier. The method also desirably has the collected roll of temporary carrier subsequently provided as a liner for labels. The method also is practiced by having the collected roll of temporary carrier (with the matrix removed) subsequently provided as a temporary reusable carrier after repetition of steps a), b) and c) on a second printed sheet material that is different from the first sheet material. By different from the first sheet is meant that it is a different sheet, not that the printing is required to be different on the second printed sheet material.

Reference to FIG. 1 will assist in explaining the module that can be used in the practice of the present invention, using the example of linerless label stock, although a simple change in this configuration (which will be later described) enables use of conventional label stock (label material on liner) will enable the use of any label material. An unwind carrier 2 having a roll of linerless label 4 is provided. The unwind carrier 2 is preferably powered as this assists in controlling the tension on the linerless label 6. A roller 8, preferably a top riding roller 8, assists in the removal of the linerless label 6 at an angle at point 10, between the top riding roller 8 and the roll of linerless label 4. The roll of linerless label 4 preferably has the linerless label 6 rolled so that the adhesive face 12 of the linerless label faces the center 14 of the unwind 2. The linerless label 6 is optionally advanced in the system to a tension control element 16 which is optionally a dancer. It is also desirable to have the linerless label material 18 after removal advanced over a registration roll or pull/registration roll 20. These two elements, the dancer 16 and the registration roll or pull registration roll 20 are preferred embodiments, a site where the linerless label sheet 22 can be temporarily supported on a reusable carrier. In this figure, the linerless label sheet 22 is fed between an anvil roll 24 and a die cutter 48, so that a linerless label sheet 22 is fed towards cutter 48 facing the anvil roller 24. The cutter 48 will have a die face (not shown here, but described in FIGS. 3 and 4) that enables micro-perforation of the label stock. The anvil roll 24, does not require a vacuum pressure anvil roller 24, because the laminating roller 32 acts as a stabilizer roller. The anvil roller 24 has a surface 26 which faces die cutter 48 that severs the linerless label according to the perforating, micro-perforating or sever-cut design on the die face (not shown). The die cutter 48 faces the adhesive face of the linerless label 22 (with a thermal, pressure-sensitive, water- or organic solvent-soluble adhesive) to form the perforated, sever-cut or micro-bridged cut along the border of a label in the sheet of linerless label 22. The distance k between the contact point between the die cutter 60 and the anvil roller 24 and the contact point between the laminating roll (or the first stabilizing roll) 32 and the anvil roller 24 mut be at least slightly less then the length l of the cut label material 44. The length k should be measured as the liner dimension along the surface of the anvil roller 24. The die cut linerless label 28 with its adhesive (e.g., pressure sensitive adhesive, thermal adhesive, solvent activated adhesive, etc.) face 30 is carried on the surface 26 of the anvil roll 24, with a die cutter 48 towards a laminator (which is acting as the stabilizing roller and laminator roller in this construction) roll 32. A liner 34 is fed from a source (e.g., a roll, not shown) of recyclable/reusable liner material. Web steering guide rollers 36 may be used to direct the liner 34 towards the laminator roll 32. The liner 34, with its release coated surface 38 facing the adhesive coated surface 30 of the die cut linerless label 28 is laminated to the die cut linerless label 28 to form a temporary linerless label/carrier system 40 comprising a potentially reusable liner/carrier 42 having a series of previously linerless micro-perforated die cut labels 44 with their adhesive faces 46 against the potentially reusable carrier/liner. This temporary linerless label/carrier system 40 may be then treated and applied to a substrate by conventional lined label applicator systems (not shown) effectively as a lined label, even though provided initially as a linerless label. The matrix is removed from the lined linerless label material by application of a force sufficient to lift the label and tear the bridges formed between the label and the matrix. The temporary linerless label/carrier system 40 may then be split or separated at the interface of the adhesive of and the release surface of the temporary, reusable liner. The label 44 applied to a substrate (not shown), and the liner may be wound on a capture system (e.g., a roll, not shown). The wound used liner (not shown) may then be used as the source of liner 34 which is fed towards the laminator roll 32. Tension controlling elements 64 that are basically a controlled circuit are associated with the transducer roll 56 and dancer 16 to assure that tension can be adjusted as needed as the matrix 50 passes over idler roller 57.

A matrix 50, comprising the residue of the linerless label 22 after the die cut label 28 is removed from the linerless label 22, is carried away from the anvil roll 24 with a die cutter 48, towards a matrix rewind (e.g., a take up rewind) 52. There is preferably an outfeed pull roll 54 and a transducer roll 56 between the die cutter 48 and the matrix rewind 52. This complete module may be attached or inserted to the conventional lined label applicator so that the temporary linerless label/carrier system 40 is fed into the conventional lined label applicator system at the point where a lined label is normally fed. This physical attachment may be done by snapping the module into receptors on the apparatus, by bolting or welding the module onto the lined label applicating apparatus, by associating an additional frame adjacent to the lined label applicating apparatus, or by any other physical means of associating the module to the lined label applicator. The module can also be a stand alone unit, allowing the reusable liner to feed into the lined label applicator system. In this manner, the module does not have to be physically fixed directly to the structure of the lined label applicator.

This system may, as previously mentioned, be used with commercial applicators, conventional applicators, conventional label liners, and commercial linerless label stock and rolls. Other optional elements within the lined label applicator include a non-stick circumferential surface feed roll, a hardened vacuum anvil cylinder cooperating with a cutting cylinder having a radially extending knife blade, which in turn cooperates with a wiper roller that applies liquid release material to the blade after each cut, and transport means having many unique features. The transport means may include a plurality of conveyor tapes that are spaced in a direction transverse to the direction of conveyance of labels thereby, and a vacuum chamber assists the adhesive from the labels in maintaining the labels in position on the conveyor tapes during conveyance. The conveyor tapes may be typically substantially circular in cross section so as to present a minimal area for engagement with the label adhesive, and the labels are separated from the conveyor tapes by a plurality of non-stick surface stripper rings which extend upwardly above the top surface of the conveyor tapes, and are associated with a peeler roller which bends the labels upwardly as they are deflected by a stripper such as stripper rings, blades, rolls or the like, or even lifted by reduced pressure supports (e.g., vacuum lifters). From the peeler roller and stripper, the labels are moved directly into contact with a moving element. Where, as typical, the labels are moved into contact with moving envelopes, the labels and envelopes pass through nip rollers whereby the pressure sensitive adhesive is activated by pressure.

One aspect of a preferred embodiment of the present invention which helps differentiate the invention from other processes and materials is the use of a generally smaller scale carrier sheet onto which the label material is originally applied. This is because most commercial manufacture of labels would be on wide sheets which are then converted into smaller sizes (narrower widths) for application. In the present invention, as the carrier is reused, it is usually only converted once, and is at least slightly larger than the labels applied (e.g., labels as narrow as 1 cm, 2 cm, 5 cm or the like could be used, up to 10, 15, 20, 25 or up to 30 cm wide). The carrier sheet, as better explained elsewhere herein, may also be thinner than liners that can be used in other manufacturing processes.

A printer, such as a thermal printer (dye hanger, due diffusion, mass transfer, etc.) or an ink printer such as a bubble jet printer, an ink jet print head or the like may also be provided in association with the conveyor tapes for printing indicia on the release coat face of the labels just prior to removal of the labels a conveyor tapes. If the ink is a hot melt ink, a heated platen is preferably provided over the release coat faces of the labels to heat them so that they are receptive to the hot melt ink.

The linerless labels may comprise a substrate having a release coated face and an opposite pressure sensitive adhesive coated face. The substrate of the label may be any sheet forming, film forming, or substrate forming material, preferably a flexible material such as paper, synthetic paper, nonwoven sheets, fabric sheets, polymeric film or sheets, and the like. Polymer sheets and films of ethylenically saturated monomers (poly vinyl resins, polyolefins, polyesters, and the like) and fabric sheets (e.g., pages, non-woven fabric, woven fabric, knitted fabric) are very useful. The adhesive may be a thermal adhesive (e.g., poly vinyl resin, polyamide, polyolefins, polyester, etc.), pressure sensitive adhesive (e.g., polyacrylate, polymethacrylate, polyurethane, polysiloxane, etc.) or solvent activatable adhesive (e.g., natural resins, synthetic resins, gums, esters, organic solvent soluble resins, water soluble or dispersible resins, polyvinyl alcohols, gelatins, polyvinyl pyrollidone, poly(meth)acrylates, polyolefins, polyvinylchloride, poly vinylidenechloride, polyvinylacetate, polyvinylacetals, cellulose resins, cellulose acetate butyrate, and mixtures thereof.

The following method steps may be practiced for applying the linerless labels to temporary liners: (a) feeding liner or tape comprising a substrate with a release coated face and an opposite pressure sensitive adhesive coated face in a first direction; (b) partially cutting the tape with micro-perforations into individual labels at a cutting position while the tape is being fed in the first direction; (c) continuously transporting the labels away from the cutting position in a second direction, by disposing the labels and attached matrix on conveyors, with the adhesive coated face contacting a conveyor; and (d) continuously separating the labels from the conveyor and matrix while tearing bridging material between the label and matrix, simultaneously applying the separated labels to moving temporary, reusable supports. It is also possible to provide printing on the release coated face while it is being transported in the second direction, and (e) continuously applying the printed labels to moving elements.

The following method steps may also be practiced for applying linerless labels to moving temporary, reusable supports: (a) Feeding the linerless label sheet comprising a substrate with a release coated face and an opposite pressure sensitive adhesive coated face in a first direction, (b) partially cutting the sheet with micro-perforations into individual labels at a cutting position while the sheet is being fed in the first direction, by bringing the release coat face of the sheet into contact with a hardened anvil, and rotating a separating element such as a knife blade extending radially from a cutting cylinder into contact with the sheet, the knife blade extending transverse to said first direction, (c) continuously transporting the labels away from the cutting position in the second direction, and (d) continuously applying the labels to moving conveyors such as a moving liner by stripping the labels from the matrix by tearing the bridge material.

Typically the elements to which the labels are applied may comprise moving envelopes, boxes, jars, bottles, packages, or the like in which case there is the further step of, after application of a label to a moving element, mechanically pressing the pressure sensitive adhesive coated face of the label into contact with the element to insure proper adherence between them, e.g. by passing them through a pair of nip rolls if thin enough or by using both a back support pressure and a front application pressure surrounding the label and the elements.

Other elements which are desirably present on the module include, for example, a lubricator applicating roll 58 which applies lubricant or release material to the cutting surface 60 surface of the die 48 where the die cutter 48 makes contact with the adhesive (either directly, or cutting through the label to adhesive on the other face), which is preferably in contact with the pressure sensitive adhesive surface (not indicated) of the linerless label 22. Sensing apparatus or elements (e.g., 64) may be present at various locations on the roll to sense and indicate to an operator or control system (e.g., computer or computer program) that the tension should be adjusted by movement of elements or speed adjustment of the system. The vacuum pressure anvil roller 24 may have areas with negative pressure V to secure the labels, or areas with variable pressure (e.g., negative pressure to hold the label, neutral or positive pressure P to release the die cut label 28).

The cutting apparatus may include a hardened anvil vacuum cylinder, rotatable about an axis parallel to the axes of rotation of an idler roll and a feed roll. At least the circumferential surface of the anvil vacuum cylinder should be hardened to preform an anvil function. A vacuum applied through the vacuum cylinder (vacuum cylinders per se are well known) holds the linerless label sheet, and the labels subsequently cut therefrom, on the peripheral surface. Cooperating with the hardened anvil vacuum cylinder for cutting the sheet tape into individual labels there may be provided a cutting cylinder having a radially extending knife blade (or radially spaced knife blades if desired). The cylinder is rotatable about an axis parallel to the axis of the anvil cylinder, and means are provided (such as a frame) for mounting the cutting cylinder adjacent to the anvil cylinder so that the cutting blade just barely makes contact with the hardened surface of the cylinder To prevent the knife blade from sticking to the sheet as it is cutting the labels, a small amount of liquid release material should be applied to the blade or to the sheet between successive cuts, This may be accomplished, for example, by an idler wiper roll which is a felt roll impregnated with release material, and is mounted for rotation about an axis parallel to the axis of rotation of the cutting cylinder, and adjacent to the cylinder, so that as the blade is rotated away from contact with the hardened anvil surface of the cylinder, it engages the felt and picks up a small amount of release liquid, incrementally rotating the wiper roll as it does so. This is only one of many obvious ways of applying release layers, others including sprays, rollers, drips, ligands, and the like.

The cut length of the labels is determined by the ratio of the feed roll revolutions to cutting cylinder revolutions (and number of cutting blade). This ratio may be changed by any conventional mechanism such as gears, single revolution clutches, or servo-motor controls.

The anvil vacuum cylinder transports the cut labels into association with the temporary reusable label. Further transport of the now temporarily lined label is made to carry it away from the cylinder, ultimately into contact with moving elements, such as envelopes or containers moving in a path. Transport may be done by tension on the composite linerless label, or by support on a conveyor, which may already be a part of the lined label applicator. The adhesive on the adhesive face of the label facilitates adherence of the labels to the temporary, reusable liners so that they can convey the labels in a transport direction to insure that the labels stay in place until it is desired to remove them to the liner. A vacuum cylinder also is preferably provided to secure the cut linerless label I transit to application to the temporary, reusable liner. The vacuum pulls air through the spaces in the surface of the cylinder, thereby providing a force holding labels on the anvil or cylinder.

The linerless label sheet may already have been printed, or it may be desirable to print indicia on the release coated faces thereof. For this purpose a printer, such as an ink jet print head, thermal transfer (mass or dye), contact printer (lithographic, relief, gravure, etc.) or like structure, may be provided. If the ink jet print head applies hot melt ink, just prior to the print head a heated platen is preferably provided for heating the release coat face of the labels to make them receptive for the ink from the print head. Once the labels have been printed and it is desired to apply them to the moving elements, such as envelopes in the desired path, in addition to removing the force of the vacuum chamber it is desirable to positively separate the labels from the temporary, reusable support. For this purpose, a stripping system to remove the labels from the temporary, reusable liner may be used. One type of stripper system comprises one or a plurality of stripper elements, such as stripper rings having non-stick circumferential surfaces, associated with a peeler roll. After separation of the labels from the temporary, reusable support, the pressure sensitive face of each label is fed into contact with an element such as an envelope, and the envelope with label applied may be passed through nip rolls whereby the pressure sensitive adhesive is activated to insure adherence of the label onto the envelope. If the element to which the label is being applied is too thick for use with nip rollers, other conventional instructions for applying pressure to the back of the element while applying pressure from the top of the label may be used. Vise-like mechanisms, pinchers, reciprocating flat plates on both surfaces, and the like may be used.

To remove the labels from the temporary, reusable liner or support, a separating mechanism will be provided by the lined label applicator, which is ordinarily part of the function of that apparatus in removing liners from labels within the apparatus. The separating mechanism comprises a stripper element(s), preferably slides, rollers, ramps, plates, blades, or stripper rings, which extend upwardly above the tops of the temporarily supported linerless label. Another, usually non-flat element in the system, such as a roll or edge (e.g., to bend the label-less liner over a non-flat area to raise an edge which can be freed for engagement and support) is used to bend or deflect each label away from the temporary, reusable liner, usually by raising an edge or corner which can be used to lift the remaining label from the temporary, reusable liner. The stripper, at least the portions that will contact the adhesive faces of the labels, may be made of or coated with non-stick material, such as polytetrafluoroethylene, polysiloxanes or crosslinked polysiloxanes. The stripper may also be the container or substrate which is to be labeled. A peeler roll, if present, may be mounted for rotation about an axis parallel to that of a vacuum, and may be provided just above the temporary, reusable liner and just prior to the stripper. A peeler roller may aid in removing the labels from the temporary, reusable liner by causing an upward bend in each label, thus causing a portion of the label to travel in a direction that is tangent to both the peeler roll and the stripper, and to be deflected by the stripper. The stripper can rotate with a drive shaft, or could be loosely mounted on a drive shaft so that relative rotation between them is possible, or could be a fixed blade or free wheeling blade.

Drive mechanisms or brakes may be placed within the module on various elements which might need or tolerate a drive mechanism or brakes, such as for example, 8, 14, 20, 26, 32, 52, and 54.

Figures 2, 2A:
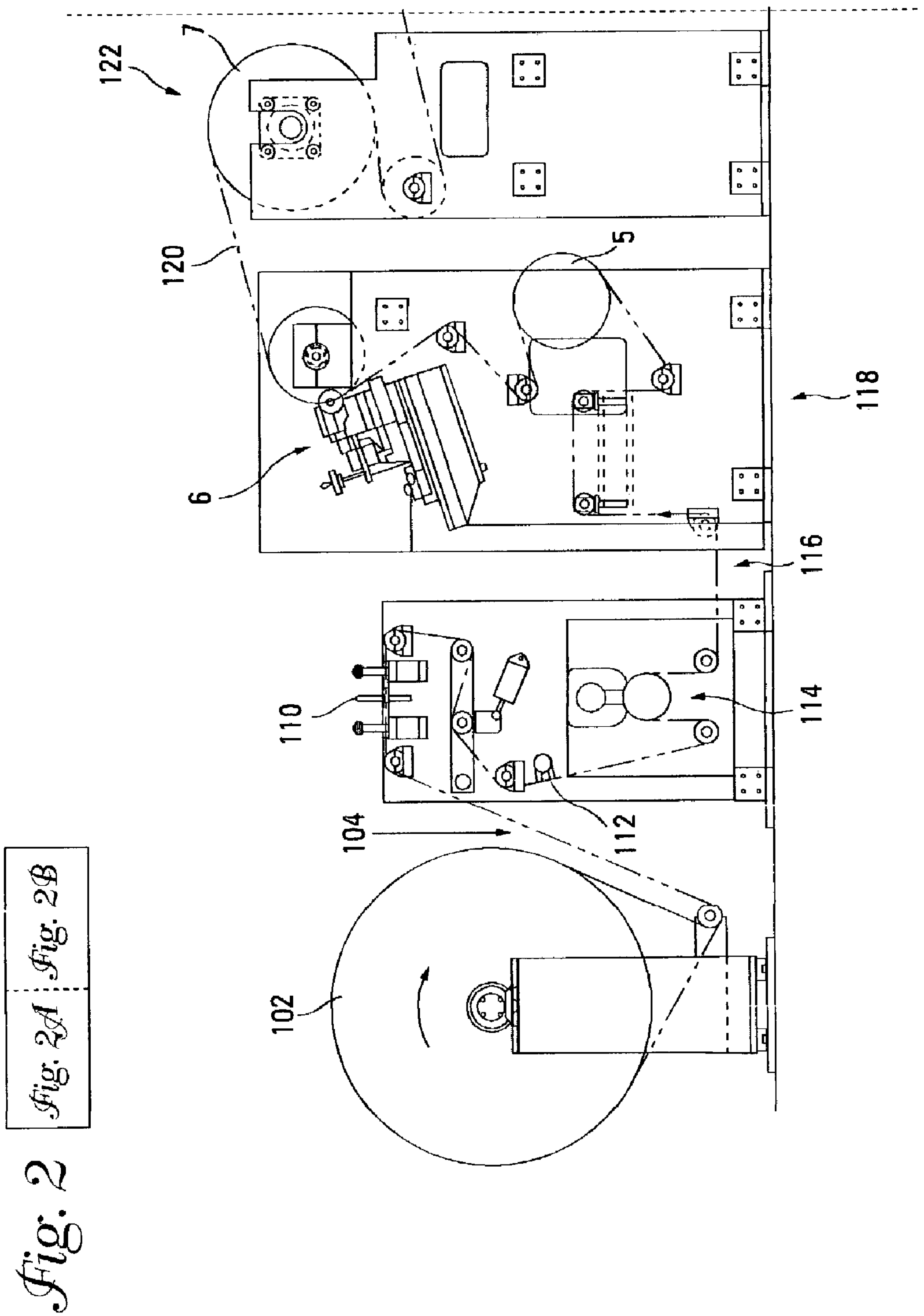
FIGS. 2, 2A, and 2B show one format of apparatus according to the present invention where adhesive is applied to the label material after printing but prior to cutting and assembling on a temporary carrier.
Figure 2B:
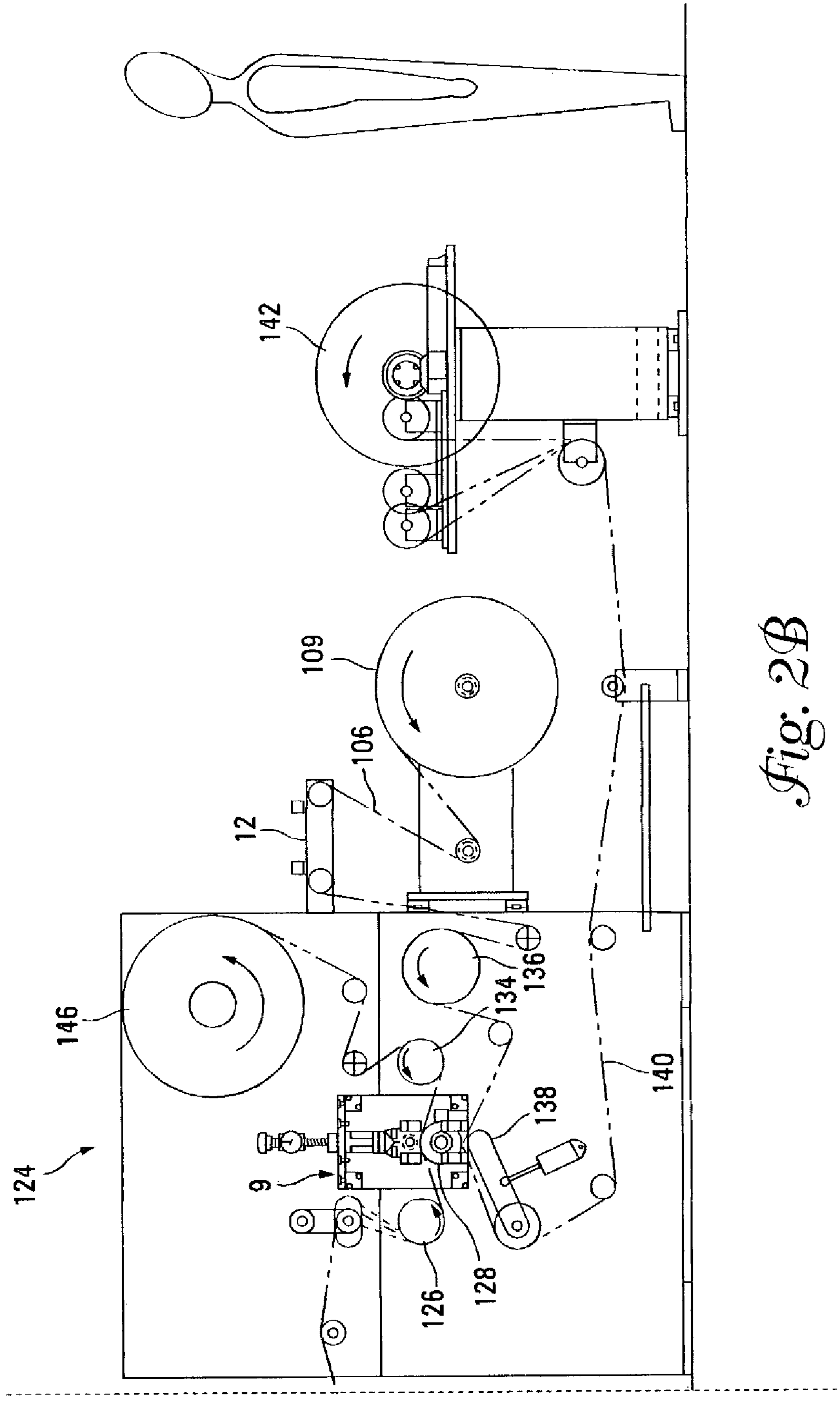

FIG. 2 shows a system 100 in which a roll 102 of printed label material 104 is coated with adhesive prior to association with a temporary, carrier 106 that is supplied from a roll 108. After initial treatment (e.g., splicing at label unwind splice table 110, cleaning on a web cleaner 112, and corona discharge treatment with a corona discharger 114), the prepared and pretreated label material 116 is transferred into an adhesive coating unit 118 where adhesive (e.g., a thermal or hot melt adhesive) is applied. The adhesive coated stock 120 may then be sent to a chill unit 122 and then to the die cutting and application unit 124. Within the die cutting application unit or module 124 may be an infeed/registration roll 126 and a die cutting station with optional vacuum transfer 128. The rotary die may also be chilled to prevent sticking or adhesive transfer. As the individual labels (not shown) are cut with microperforations, they may be (according to this description of this aspect of the invention) supported within the die cutting with vacuum transfer segment 128 and applied (adhesive side down or adhesive side up) onto a temporary carrier 106 which has been unwound from a supply roll 108. The carrier material 106 may of course be recycled or reused material. Within the die cutting with vacuum transfer segment 128 may be, for example, an outfeed matrix pull roll 134 which removes the severed matrix (not shown), an infeed temporary carrier pull roll 136, and a laminating roll 138. The laminated, adhesive coated labels (not shown) on the reusable temporary carrier assembly 140 is then transported to a rewind takeup 142 and the matrix 144 is taken to the matrix rewind roll 146.

Figure 5:
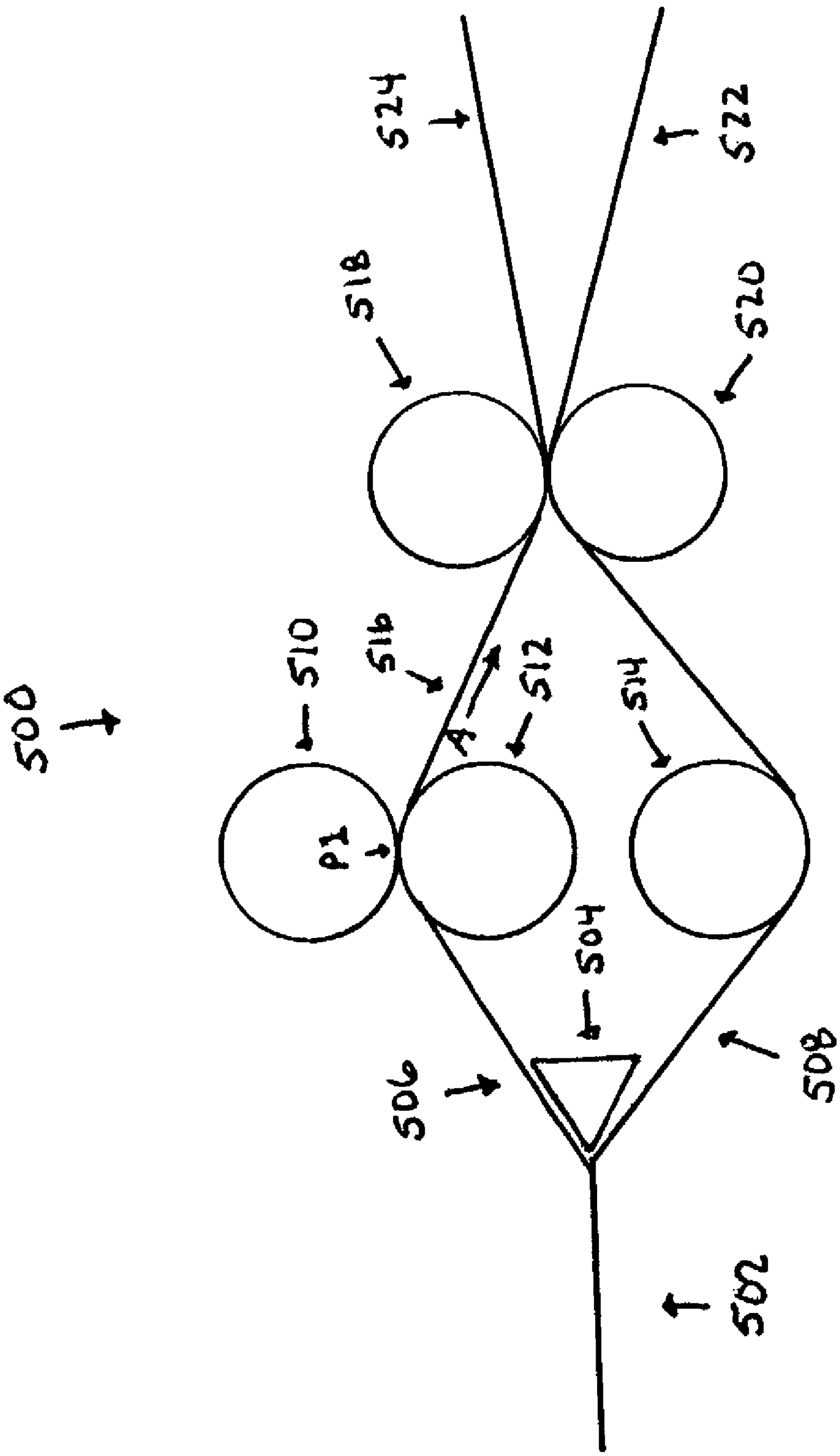
FIG. 5 shows a schematic rendering of a delamination/cutting/relamination process and apparatus of the invention.
Figure 6:
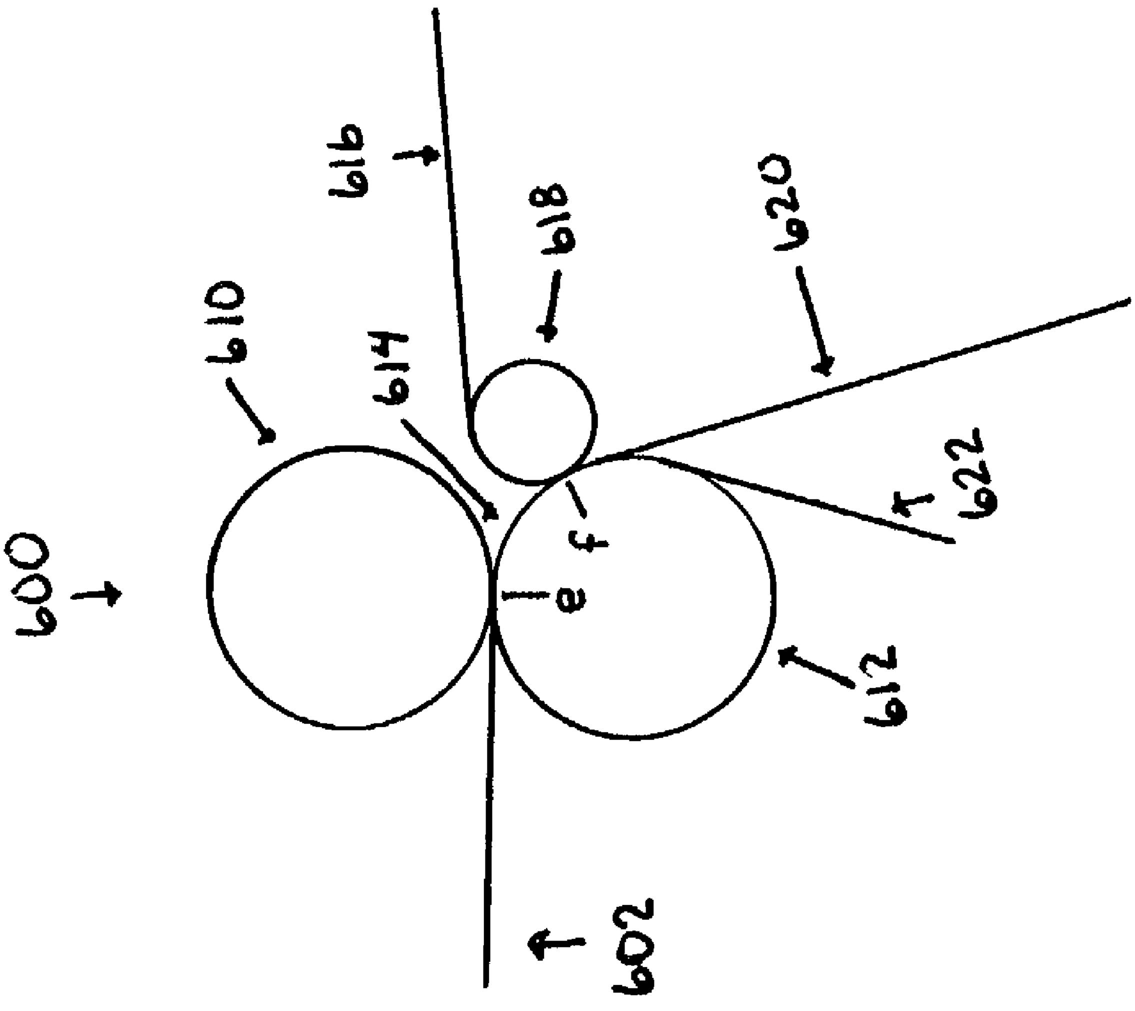
FIG. 6 shows a stabilizing roller system in accordance with apparatus and processes of the present invention.

FIG. 5 shows a blowup of the alternative system 500 for using conventional label stock 502 and delaminating the label material 506 from the liner before cutting the label material and liner stock. FIG. 5 shows a subcomponent system for the delamination and relamination of conventional lined label stock 502. The conventional lined label stock 502 is fed into the system 500, with the stock 502 being split into two web streams, the label material 506 stream and the liner 508 stream. The liner 508 stream is guided by roller 514. The label material 506 stream is fed between a die cutter roller 510 and an anvil roller 512. The center point P1 (in FIG. 5, and 3 in FIG. 6) of contact between the die cutter roller 510 and the anvil roller 512 is identified. There is still pressure provided by the die cutter roller 510 and the anvil roller 512 along the pathway of the label material 506, and that may be sufficient pressure for some modest distance along the nip between the die cutter roller 510 and the anvil roller 512. In FIG. 6, the cut label 516 (in FIG. 5) and 614 (in FIG. 6) is then moved towards the support or stabilizing roller 618 and another nip point f (in FIG. 6) is formed. The liner material 614 is fed between the stabilizing roller 618 and the anvil roller 612 and the distance along the surface of the anvil roller 612 between nip points e and f are approximately at least equal to the length from leading edge to trailing edge of individual cut labels (not shown) in the cut label material 516. As noted, e and f represent the points of maximum pressure (the center points) in the nips between the die cutter roller 610 and the anvil roller 612 and the stabilizing roller 618 and the anvil roller 612, respectively. There is sufficient pressure provided by these pairs of rollers (i.e., the nips between the die cutter roller 610 and the anvil roller 612 and the stabilizing roller 618 and the anvil roller 612) to provide stabilizing pressure, so the length of the cut label does not absolutely have to be as long as the linear surface distance along the anvil roller 612 between nip points e and f to provide stabilizing compression forces on the cut label 614 and between the cut label 614 while it is between the nip between the die cutter roller 610 and the anvil roller 612, and the liner 616 and the cut label 614 at nip f. The term "approximately equal to the distance between the nip points between a) the die cutter roller and the anvil roller and b) the stabilizing roller and the anvil roller" therefore means the distance where stabilizing pressure is provided in the nips so that both ends of the label are under pressure from nip rollers at both ends of the cuts in the label along the direction of movement of the label through the system. This distance cannot be readily quantified (even relative to the length of the label) because it is dependent upon roller diameters, compressibility of the rollers, stretchability of the label material, and other factors. These distances (that is, the distance that is approximately equal to the distance between the nip points between a) the die cutter roller and the anvil roller and b) the stabilizing roller and the anvil roller can be readily determined by routine experimentation based on the teachings of this specification by simply moving the stabilizing roller 618 backward along the path of movement A of the cut label material 516 stream.

FIG. 5 shows a schematic rendering of the delamination/cutting/relamination apparatus 500 of the present invention. The liner stock material on a carrier 502 is intercepted by a splitter 504 which delaminates the label material 506 from the carrier material 508. The label material 506 passes into a cutting area between an anvil roller 510 and a die roller 512. The cut label carrying the matrix bound by the microbridging 516 is carried further into the apparatus 500. The separated carrier 508 is carried over a support roller 514. The carrier 508 and the stable cut label material 516 are relaminated between rollers 518 and 520. After relamination, the matrix 524 is stripped from the carrier with the cut label thereon 522. The ability of microbridging (not shown in this FIG. 5) enables the critical transport of a stable cut label material 516 between the cutting zone in the anvil 510 and die cutter 512 region to the relamination between rollers 518 and 520. Without the microbriding in an area where the cut label material is free-standing and is not supported by other surfaces or pressure, the matrix would separate from the label, usually with the labels being unsupportable as they cannot be provided with individual supports.

FIG. 6 shows a schematic rendering of apparatus 600 that has a stabilizing roller 618 in the system to allow formation of the cut label stock on a carrier 620 according to another aspect of the invention. Uncut label material 602 is fed to the nip between an anvil roller 612 and the die cutting roller 610 which form a nip at point e. A stabilizing roller 618 forms a nip at point f between the stabilizing roller and the anvil roller 612. The distance between nip points e and f must be equal to or less then the length of the label 614 just after it has been cut. Preferably the distance between nip points e and f is less then the length of the label 614 as explained elsewhere, The carrier material 616 is also fed into the nip f between the stabilizing roller and the anvil roller 612 to be laminated to the cut label material. After passing nip point f, the matrix 622 can be formed by stripping it from the cut label material on the carrier 620. The stabilizer bar enables the label material 602 to be completely cut (without microbridging) from the matrix 622. The label 614 is effectively supported on both ends of the label by the two nips e and f. The label material 602 may be microbridged for additional stability, but that isn't necessary with the stabilizing roller 618.

The above descriptions have provided teachings that enable the practice of a generic invention. It is intended that the descriptions are exemplary of generic concepts and not limitations to specific embodiments of the examples. One of ordinary skill in the art, upon reading this specification, will be enabled for a broad practice of the invention and will appreciate that alternative structures, materials, and method steps will effect the purposes and teachings of the invention and that the following claims are intended to encompass the full breadth of the disclosed invention.

What is claimed is:

1. A method for forming a cut label on a liner comprising:

feeding a web of label material to a cutting station and forming a cut label material having an adhesive face on the cut label material;

cutting the label material to provide a matrix adjacent a leading edge of the cut label and a trailing edge of the cut label, the distance between the leading edge and the trailing edge defining a length for the cut label;

stabilizing the leading edge of the label material with respect to the matrix adjacent the leading edge before the trailing edge of the label material leaves the cutting station, the stabilizing being effected without vacuum being distributed over an area comprising at least 50% of the surface area of the cut label;

feeding the leading edge of the label material and the matrix adjacent the leading edge of label material into a nip formed between a set of rollers, while the trailing edge of the label is stabilized without vacuum;

feeding a web of liner into the set of rollers against the adhesive face.

2. The method of claim 1 wherein stabilizing the leading edge is performed without any vacuum being applied to the cut label material.

3. The method of claim 2 wherein a stabilizing force is applied by a physical element pressing the leading edge against a surface of a roller.

4. The method of claim 2 wherein the cutting station comprises a laser cutter.

5. The method of claim 4 wherein stabilizing the leading edge is performed without any vacuum being applied to the cut label material.

6. The method of claim 5 wherein a stabilizing force is applied by a physical element pressing the leading edge against a surface of a roller.

7. The method of claim 2 wherein the cutting station comprises an anvil roller and die cutter.

8. The method of claim 7 wherein stabilizing the leading edge is performed without any vacuum being applied to the label material.

9. The method of claim 8 wherein a stabilizing force is applied by a physical element pressing the leading edge against a surface of a roller.

10. The method of claim 9 wherein the stabilizing force is applied by a roller nip formed against the anvil roller by a separate stabilizing roller.

11. The method of claim 8 wherein the stabilizing force is applied by a roller nip formed against the anvil roller by a separate stabilizing roller.

12. The method of claim 8 wherein the label material is provided by stripping liner from label material.

13. The method of claim 8 wherein the liner has an average thickness of less than 0.025 mm.

14. The method of claim 7 wherein the stabilizing force is applied by a roller nip formed against the anvil roller by a separate stabilizing roller.

15. The method of claim 14 wherein there is a distance, between a location on the anvil roller where the trailing edge is cut and a stabilizing nip for stabilizing relative movement between the cut label and the matrix, being approximately less then or equal to the length of the label.

16. The method of claim 15 wherein the label material is provided by stripping liner from label material.

17. The method of claim 15 wherein the liner has an average thickness of less than 0.025 mm.

18. The method of claim 14 wherein the label material is provided by stripping liner from label material.

19. The method of claim 14 wherein the liner has an average thickness of less than 0.025 mm.

20. The method of claim 7 wherein the label material is provided by stripping liner from label material.

21. The method of claim 7 wherein the liner has an average thickness of less than 0.025 mm.

22. The method of claim 2 wherein the cutting station comprises an anvil roller and hammer die cutter.

23. The method of claim 2 wherein the label material is provided by stripping liner from label material adhered to a liner.

24. The method of claim 2 wherein the liner has an average thickness of less than 0.025 mm.

25. A method of applying labels to a substrate wherein after forming the label stock according to the method of claim 1, individual labels from the microbridged label are removed from the liner, leaving a matrix of label material on the liner, and the individual labels are applied to a substrate.

26. The method of claim 25 wherein the temporary liner comprises a polymer film of less than or equal to about 0.025 mm in thickness.

27. A method of applying labels to a substrate wherein after forming the label stock according to the method of claim 1, the matrix from the microbridged label is removed from the liner, leaving cut labels of label material on the liner, and the individual labels are subsequently applied to a substrate.

* * * * *